United States Patent
Bohnes

(10) Patent No.: US 6,237,968 B1
(45) Date of Patent: May 29, 2001

(54) PIPE CONNECTOR HAVING A CONNECTING PORTION FORMED ONTO ONE PIPE END

(75) Inventor: Karlheinz Bohnes, Bochum (DE)

(73) Assignee: Walterscheid Rohrverbindungstechnik GmbH, Lohmar (DE)

( * ) Notice: Subject to any disclaimer, the term of this patent is extended or adjusted under 35 U.S.C. 154(b) by 0 days.

(21) Appl. No.: 09/353,501

(22) Filed: Jul. 14, 1999

(30) Foreign Application Priority Data

Jul. 15, 1998 (DE) .............................. 198 31 626

(51) Int. Cl.[7] .............................. F16L 25/00; F16L 35/00
(52) U.S. Cl. .................... 285/334.2; 285/334.5; 285/354
(58) Field of Search ............................ 285/334.1, 334.2, 285/334.4, 334.5, 354

(56) References Cited

U.S. PATENT DOCUMENTS

| | | | |
|---|---|---|---|
| 2,863,678 | * 12/1958 | Gordon et al. | 285/334.5 |
| 3,258,278 | * 6/1966 | Miller, Jr. | 285/334.2 X |
| 3,381,980 | * 5/1968 | Smith | 285/334.2 X |
| 3,702,199 | * 11/1972 | Brooks et al. | 285/334.2 X |
| 6,007,112 | * 12/1999 | Kim | 285/334.5 |

FOREIGN PATENT DOCUMENTS

| | | |
|---|---|---|
| 667 485 | 10/1938 | (DE) . |
| 1071772 | 6/1967 | (GB) . |

\* cited by examiner

*Primary Examiner*—Neill Wilson
(74) *Attorney, Agent, or Firm*—Harness, Dickey & Pierce, P.L.C.

(57) ABSTRACT

The invention relates to a pipe connector with a connecting portion (4) formed by a non-chip producing method. On one pipe end of the pipes. The connecting portion (4) includes an outer conical face (7) and a first conical bore (10). A first connecting element (13) with a conical supporting bore (15) is adapted to contact the outer conical face (7). A second connecting element (17), in the form of a connecting body, is provided to thread onto the first connecting element (13), in the form of a nut. The second connecting element (17) has a counter sealing face (21) in the form of a conical bore. A sealing element (23) cooperates with the first conical bore (10) of the connecting portion (4) and with the counter sealing face (21) in the form of a conical bore of the second connecting element (17). The sealing element (23) has a first outer conical sealing face (25) and a second outer conical sealing face (26). The faces (25, 26) are designed to match the first conical bore (10) and the counter sealing face (21) in the form of a conical bore. A free-form face (9) is provided between the outer conical face (7) and the cylindrical outer face (8) of the connecting portion (4). The free-form face (9), during the forming process, can take on any shape. Thus, the free-form face (9) can be used to achieve surfaces which can be accurately reproduced and which, in cooperation with other components, ensure a sealing effect.

20 Claims, 4 Drawing Sheets

PIPE CONNECTOR HAVING A CONNECTING PORTION FORMED ONTO ONE PIPE END

CROSS-REFERENCE TO RELATED APPLICATIONS

This application claims priority upon German application 198 31 626.7 filed Jul. 15, 1998, which is incorporated herein by reference.

BACKGROUND OF THE INVENTION

The invention relates to a pipe connector having a connecting portion formed onto one end of the pipe.

DE-PS 667 485 discloses a pipe connector for pipes made of soft materials such as copper, aluminum or the like which are easily deformable. A threaded member is provided with a stepped bore. Radius-shaped transitions are provided between the bore steps. The nut which can be threaded onto the connecting body is provided on a pipe which is widened at one end. A connecting sleeve is provided between the threaded member and the nut. The connecting sleeve is inserted into the widened ends of the pipe. The connecting sleeve, at its ends, includes conical faces. Stepped faces adjoin the conical faces. One of the stepped faces is designed as an undercut conical face. During tightening, the widened pipe ends are press fit with the identically designed ends of the connecting element. As the latter includes sharp-edged transitions, the pipe wall is cut into achieving a close connection. Such a design can only be applied to easily deformable pipes. Furthermore, it is only suitable for low pressures and, especially, for substantially static loads. For thick-walled pipe connectors subjected to high loads, like those used in hydraulic systems, such an embodiment is not suitable. In particular, when dynamic loads occur, the connection may tear off as a result of sudden pressure surges.

SUMMARY OF THE INVENTION

It is an object of the present invention to provide a pipe connector which enables the pipe to be securely clamped and sealed at high pressure and high dynamic loads.

In accordance with the invention, a pipe connector is provided with a connecting portion formed by a non-chip producing method onto an end of a pipe. The pipe end has an outer conical face with a cone angle of ninety degrees. The outer conical face, starting from the undeformed region of the pipe, increases in size towards the end face of the connecting portion. The connecting portion has a cylindrical outer face starting from the end face and extending towards the outer conical face. The connecting portion has a free-form face which, between the outer conical face and the end of the cylindrical outer face, facing the outer conical face, remains undefined during the non-chip forming operation. The connecting portion has a first conical bore which is tapered from the end face at a cone angle of twenty-four degrees. Towards the bore of the undeformed region of the pipe, the connecting portion has a further tapered bore portion. A first connecting element includes a receiving bore through which the undeformed region of the pipe is guided. The first connecting element, towards the connecting portion, has a conical supporting bore which matches the outer conical face. The conical supporting bore is designed to rest against the outer conical face. A sealing element is provided with a central through-bore. The sealing element also includes a first conical sealing face matching the first conical bore of the connecting portion. A second sealing face of the sealing element is designed to rest against a counter sealing face of a second connecting element. Alternately, the sealing element rests against a first conical bore of a further connecting portion formed onto a second pipe. Also, a means connects the first connecting element to the second connecting element.

The above embodiment in accordance with the invention can also be used for thick-walled pipes. Furthermore, as a result of the contours selected, the region of the connecting portion to be clamped is thickened. Thus, this secures a safe connection in the case of high and rapidly changing pressure values. Such a design also provides a high-quality replacement for so-called welded nipple connections where a connecting element is welded to the pipe end. As compared to such a connection, the operation of welding on the welding nipple is no longer required. Accordingly, a connection is achieved which can also be used for standardized components and in cutting ring connections which utilize a connecting body and a union nut.

To prevent, as far as possible, the flowing medium from whirling, the sealing element also fills the second conical bore of the connecting portion. Further, the diameter of the through-bore is adapted to the diameter of the bore of the pipe.

In a first embodiment, including a nut and a connecting body, the first connecting element is in the form of a nut with a threaded bore. The internal diameter of the nut is greater than the diameter of the cylindrical outer face of the connecting portion. The second connecting element is in the form of a connecting body with a conical connecting bore. The bore size decreases from its end face. The conical bore has a cone angle of twenty-four degrees, which forms a counter sealing face. The second connecting element also includes an adjoining through-bore. The second sealing face of the sealing element is designed as a matching outer conical face.

As a result, it is possible to select a DIN nut with its standard length and the standard conical bore of ninety degrees. Further, a connecting body can be standardized with a twenty-four degree conical bore. The nut may be used for connections other than cutting ring connections such as a connection with a formed-on connecting portion.

According to an alternative embodiment, the first connecting element is in the form of a flange with circumferentially distributed bolt through-bores to receive connecting bolts. The second connecting element includes a through-bore and threaded bores distributed around the through-bore in accordance with the bolt through-bores for the connecting bolts. A planar counter sealing face is positioned around the through-bore. The sealing element has a planar second sealing face which matches the counter sealing face. The longitudinal axis of the sealing element is positioned perpendicularly to the flange. The second connecting element can form part of a machine or a valve block or the like. The pipe is connected to the valve block or the like.

A particularly advantageous embodiment is achieved if two pipes are connected directly to one another. Here, a mirror-image-like arrangement is on both pipe ends with the characteristics in accordance with the invention. A pipe connector for connecting two pipes to connecting portions is formed by a non-chip producing method onto the pipe ends of the pipes. The connecting portions each comprise an outer conical face with a cone angle of ninety degrees. The conical face, starting from the undeformed region of the pipes, increases in size towards the end face of the connecting portion. The connecting portions each include a cylindrical outer face starting from the end face and extending towards the outer conical face. The connecting portions have free-form faces which, between the outer conical face and the end of the cylindrical outer face facing the outer conical face, remain undefined during the non-chip forming operation. The connecting portions, inside, have a first conical bore which is tapered from the end face at a cone angle of twenty-four degrees. Adjoining the first conical bore towards the bore of the undeformed region of the pipe is a further tapered bore portion.

A first connecting element and a second connecting element are each provided with a receiving bore to guide an undeformed region of the pipe through the connecting element. The connecting elements, towards the connecting portions, have a conical supporting bore. The supporting bore matches the outer conical face and is designed to rest against the face.

A sealing element, with a central through-bore with a first conical sealing face, matches the first conical bore of the connecting portions. A second conical sealing face of the sealing element is designed to rest against a counter sealing face of a second connecting element.

Also included is means to connect the first connecting element to the second connecting element. The first and second connecting elements are in the form of flanges. The flanges include circumferentially distributed bolt through-holes to receive connecting bolts. The second connecting element corresponds to the first connecting element. The second sealing face of the sealing element is designed so as to be mirror-symmetric relative to the first sealing face.

A stop face limits the degree of tightening. The stop face supports the connecting portion by means of its end face when the required degree of tightening has been reached. It is reached when the first sealing face is inserted deeply enough into the first conical bore of the connecting portion. In a first embodiment including a nut and a connecting body, the stop face is formed by the end face of the second connecting element, which constitutes the connecting body. In an embodiment which enables a radial assembly, the stop face is on a collar of the sealing element. In an assembly where two pipes are clamped directly against one another by their connecting portions, the stop face is formed by the end face of the connecting portion of the further pipe.

A soft seal is provided between the first sealing face of the sealing element and the first conical bore of the connecting portion, as well as, between the second sealing face of the sealing element and the associated counter sealing face to achieve a high degree of precision sealing. The soft seals are preferably received in grooves of the first and second sealing faces.

From the following detailed description, taken in conjunction with the accompanying drawings and subjoined claims, other objects and advantages of the present invention will become apparent to those skilled in the art.

BRIEF DESCRIPTION OF THE DRAWINGS

Different embodiments of the invention are diagrammatically illustrated in the drawing wherein.

DETAILED DESCRIPTION OF THE PREFERRED EMBODIMENT

Figure 1:
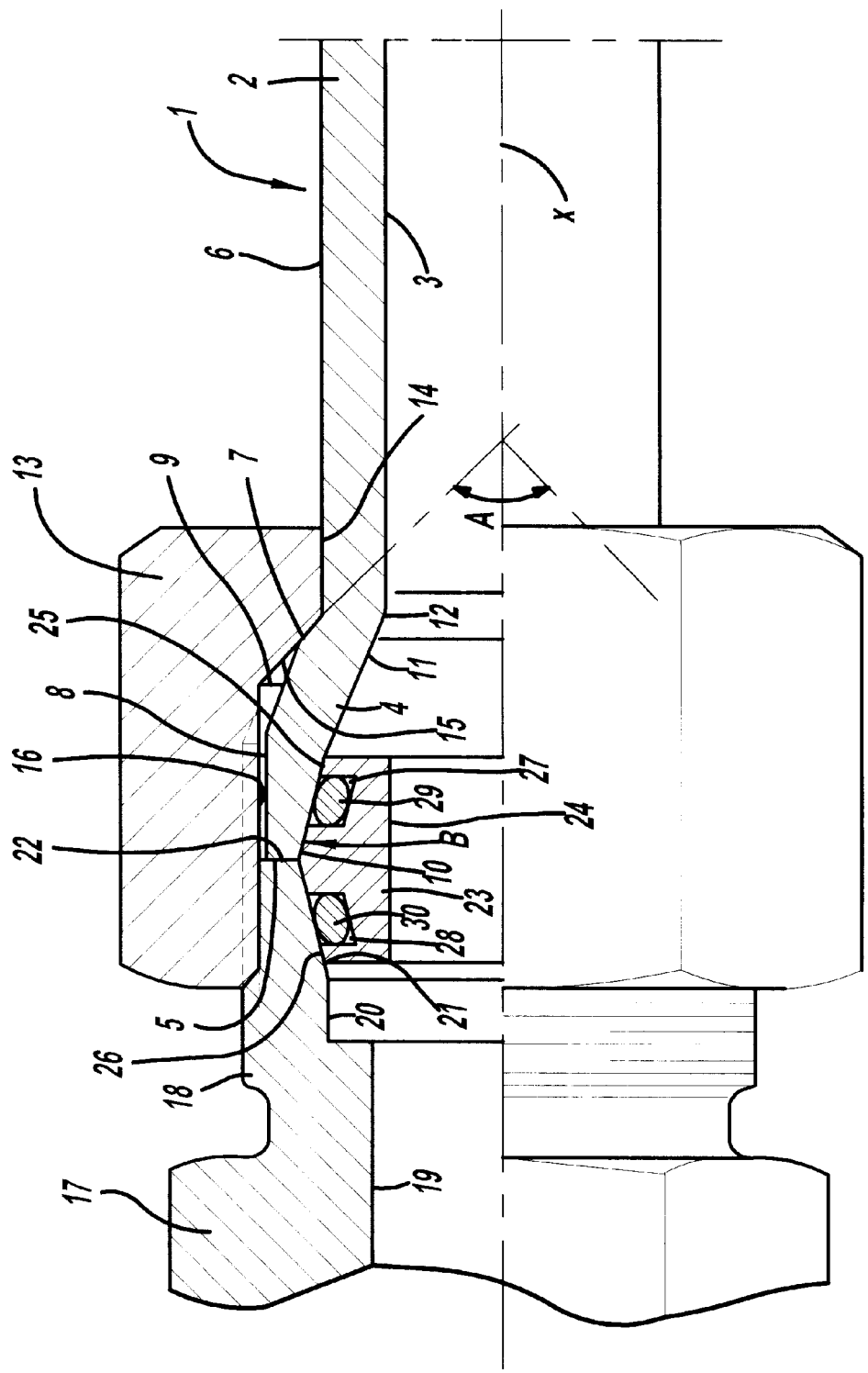
FIG. 1 is a partial cross-section view of a first embodiment of the connector with a connecting body and a nut as connecting elements.

FIG. 1 shows a pipe connector with a pipe 1 including a specially formed connecting portion 4 and an undeformed region 2 with a bore 3. The cylindrical pipe 1 has a pipe end with a connecting portion 4 formed on by a non-chip-producing method. Starting from the cylindrical outer face 6 of the tube 1, the connecting portion 4 includes an outer cylindrical face 7 which widens towards the end face 5. The conical face has a cone angle A=ninety degrees. A cylindrical outer face 8 starts from the end face 5. The cylindrical outer face 8 does not contact the outer conical face 7. Between the two faces, a free-form face 9 is provided which is produced during the forming operation. During forming, the inner contour of the connecting portion 4 is produced.

The inner contour includes a first conical bore 10 which starts from the end face 5. The bore 10 has a cone angle B of twenty-four degrees. The bore 10 is followed by a further bore portion 11. The bore portion 11 is a conical bore whose cone angle is greater than the cone angle B. The bore portion 11, by means of the transition portion 12 extending in the radius, changes into the bore 3. The above-described faces are centered on the longitudinal axis X. The longitudinal axis X also constitutes the longitudinal axes of the further components of the pipe connector. The tool thus accurately forms the inner contour of the first conical bore 10, the bore portion 11, the transition portion 12 and, on the outside, the outer conical face 7 and the cylindrical outer face 8.

Any inaccuracies resulting from fluctuations in the thickness of the pipe are compensated for by the free-form face 9. It is thus possible to produce a connecting portion 4 by a non-chip-forming method with a high degree of repeat accuracy. The cross-sections can be produced in such a way that in the region of the connecting portion 4, a higher concentration of masses can be achieved than in the undeformed region 2 of the pipe 1 in order to ensure a higher dimensional stability for the connector and for the attachment of the pipe 1.

A first connecting element 13, in the form of a union nut, is slipped over the cylindrical outer face 6 of the pipe 1 in its undeformed region 2. The first connecting element 13 has a receiving bore 14. The pipe 1 is introduced into the connecting element 13 and surrounds the outer face 6 with play. The first connecting element 13 has a conical supporting bore 15 which matches the outer conical face 7. The supporting bore 15 has a cone angle which amounts to ninety degrees and is centered on the longitudinal axis X. A threaded bore 16 follows the supporting bore 15. The free diameter of the threaded bore 16 is greater than the outer diameter of the cylindrical outer face 8 of the connecting portion 4.

The second connecting element 17 is in the form of a connecting body. The second connecting element 17 has an outer thread 18 which starts from the end stop face 22. The first connecting element 13 in the form of a union nut is threaded onto the second connecting element 17. Furthermore, the second connecting element 17 includes a conical bore 21 in the form of a counter sealing face 21. The sealing face 21 starts from the stop face 22 and has a cone angle of twenty-four degrees which corresponds to the angle of the first conical bore 10 of the connecting portion 4. The conical counter sealing face 21 is tapered, starting from the stop face 22 along the longitudinal axis X.

The sealing face 21 ends in a cylindrical bore step 20. The bore step 20 changes, by means of a step, into the through-bore 19. The through-bore 19 extends through the second connecting element 17. The second connecting element 17, at its other end (not illustrated) may be designed as described above. Alternatively, it is provided with only an outer thread and is shaped like a journal. Here, the through-bore 19 extends and serves to be connected to a machine part in order to provide a fluid conducting connection.

A sealing element 23 has a through-bore 24 which is centered on the longitudinal axis X. The diameter of the through-bore 24 of the sealing element 23 approximately corresponds to that of the bore 3 of the undeformed region of the pipe 1. The sealing element 23 defines a first sealing face 25 matching the first conical bore 10. The sealing element 23 also has a second sealing face 28 which, in the present embodiment, is designed to match the counter sealing face 21. The sealing element 23 is received in the conical bore 10 of the connecting portion 4 by its first sealing face 25. A soft seal 29 is provided to achieve precision sealing.

The soft seal 29 is received in annular groove 27 of the sealing element 23. The second sealing face 26 has an annular groove 28 accommodating an O-ring in the form of a soft seal 30. The soft seal 30 ensures precision sealing relative to the counter sealing face 21 of the second connecting element 17.

When tightening the first connecting element 13, provided in the form of a union nut, the connecting portion 4 is tensioned relative to the second sealing face 26 of the sealing element 23. The second sealing face 26 presses itself into the counter sealing face 21, shaped like a conical bore. The connecting portion 4, by means of its first conical bore 10, rests against the first sealing face 25 of the sealing element 23. When the connecting element 13 is fully tightened, the connecting portion 4, via its end face 5, comes to rest against the stop face 22 of the second connecting element 17.

Figure 2:
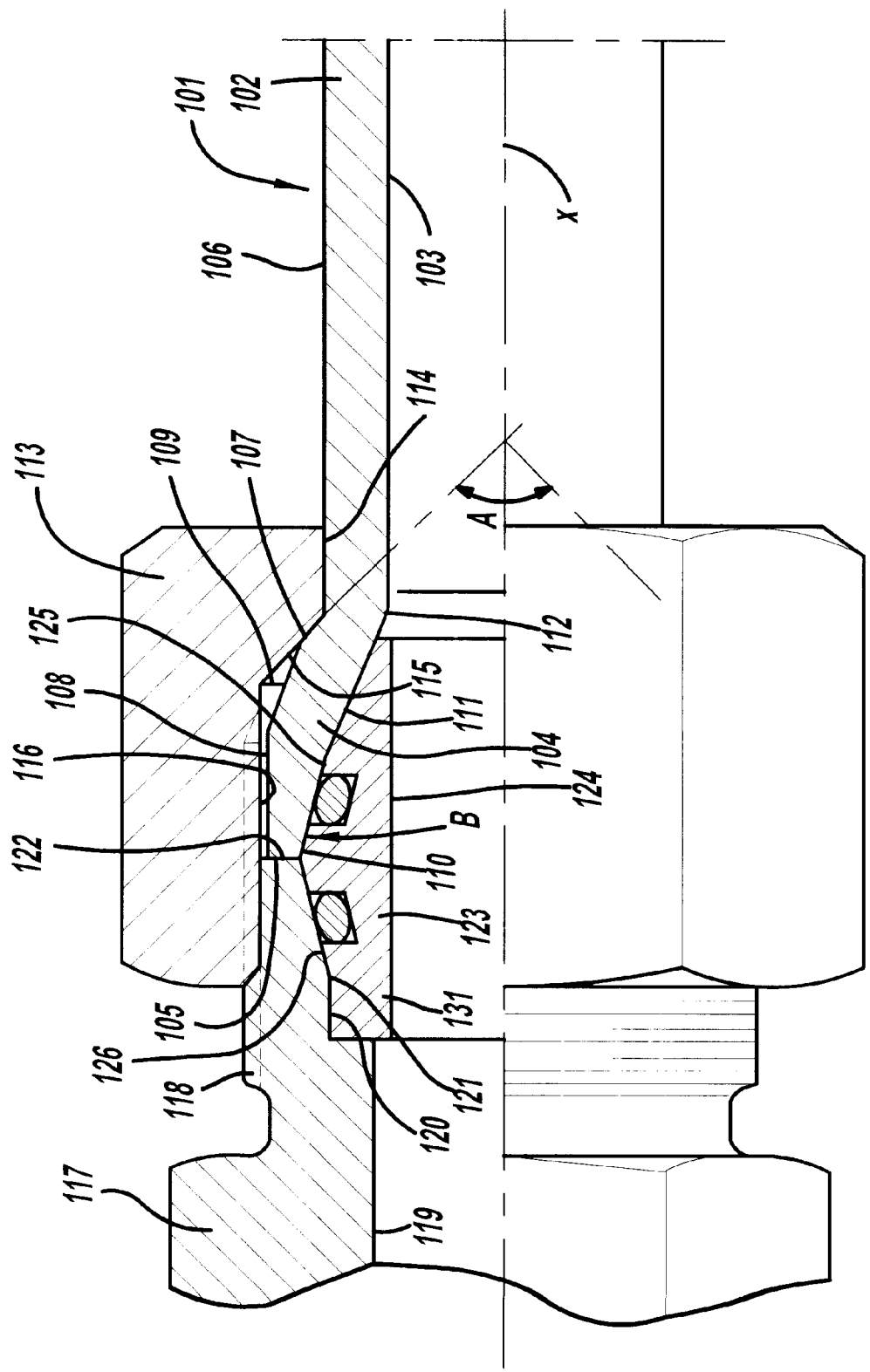
FIG. 2 is a partial cross-section view of a modified embodiment of FIG. 1.

In FIG. 2, identical components have been given reference numbers increased by 100. The sealing element 123 deviates from the embodiment according to FIG. 1. The sealing element 123 has a step 31 which matches the bore step 120. The sealing element 123 has an extension which extends towards the undeformed region 102 of the pipe 101. The pipe 101 also has a second bore portion 111 adjoining the first conical bore 110. Thus, a substantially continuous smooth extension for the bore 103 of the pipe is achieved. This means that the flow conditions are either not disturbed at all of they are disturbed only slightly.

Figure 3A:
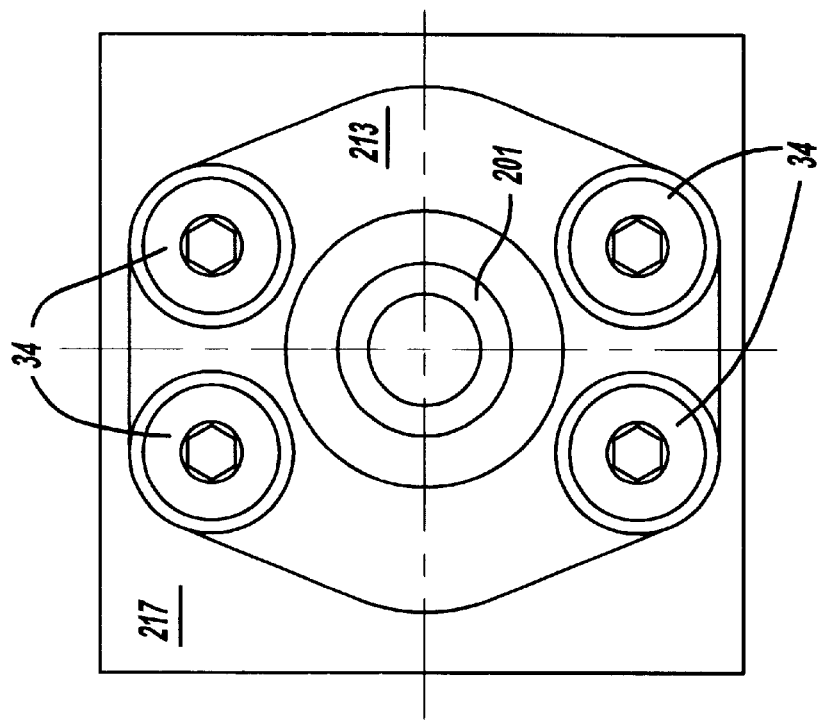
FIG. 3a is a side view of FIG. 3.
Figure 3:
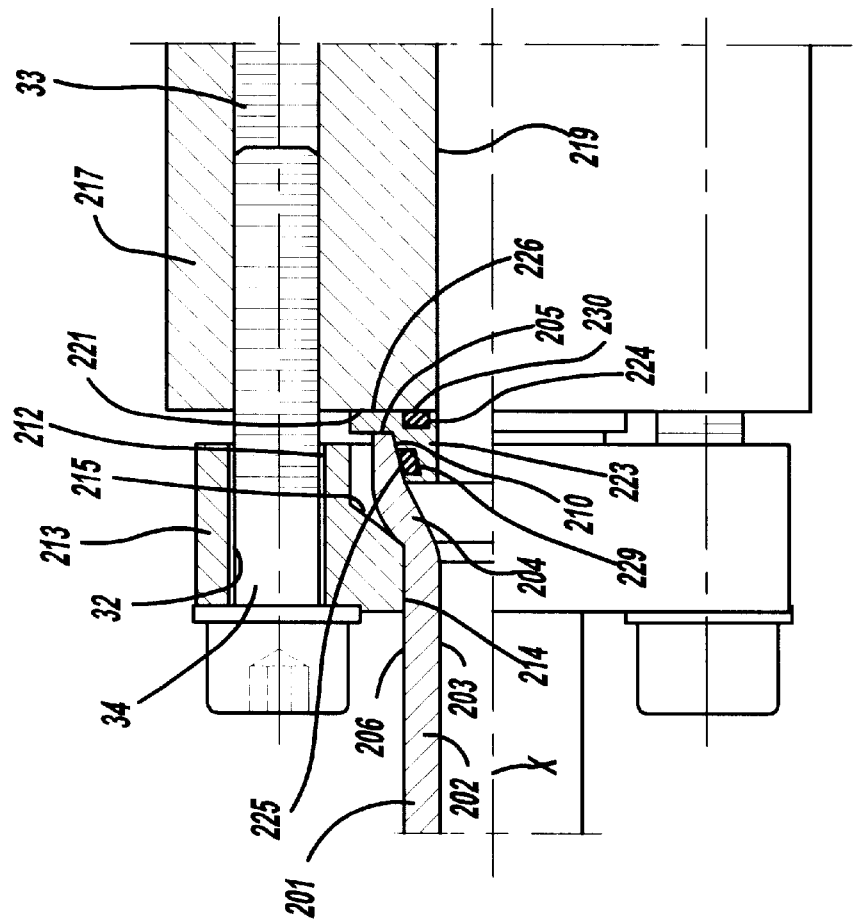
FIG. 3 is a partial longitudinal section view of a further embodiment having a flange.

FIGS. 3 and 3a show a further embodiment of an inventive pipe connector. A pipe 201 has a connecting portion 204 which corresponds to that described in connection with FIGS. 1 and 2. The reference numbers referring to parts which correspond to those shown in FIGS. 1 and 2 have been increased by 200 as compared to FIG. 1.

In the case of the above embodiment, the first connecting element 213 is in the form of a flange. The flange has circumferentially distributed bolt through-bores 32. A total of four bolt through-holes 32 are arranged as shown in FIG. 3a. The first connecting element 213 has a non-circular shape. The connecting element 213 has a conical supporting bore 15. The second connecting element 213 may be a projection of a machine attaching means or it may form part of a valve block to which the pipe 201 is connected.

The second connecting element 217 has a through-bore 219 which can be conductingly and sealingly connected to the pipe 201. The diameter of the through-bore 219 substantially corresponds to that of the bore 203. The through-bore 219 is also centered on the longitudinal axis X, like the other components. Around the longitudinal axis X, threaded bores 33 are distributed in accordance with the positions of the bolt through-bores 32. Connecting bolts 34 are inserted into the bores 32 to tension the pipe 201 with the connecting portion 4 relative to the sealing element 223.

The sealing element 223 has a first conical sealing face 225 which matches the first conical bore 210. A soft seal 229 is provided in a groove on the face 225. The sealing element 223 has a planar second sealing face 226. The sealing face 226 has a groove with a soft seal 230. A sealing effect is achieved relative to a planar counter sealing face 221 which forms part of the second connecting element 217.

The sealing element 223 has a collar which adjoins the greatest diameter of the first conical sealing face 225. The collar forms a stop face 222 for the end face 205 of the connecting portion 204. The stop face 222 prevents excessive tightening when tightening the connecting bolts 34. The advantage of this embodiment is that it allows a radial assembly since the longitudinal axis X is positioned perpendicularly on the face forming the second sealing face 226.

Figure 4A:
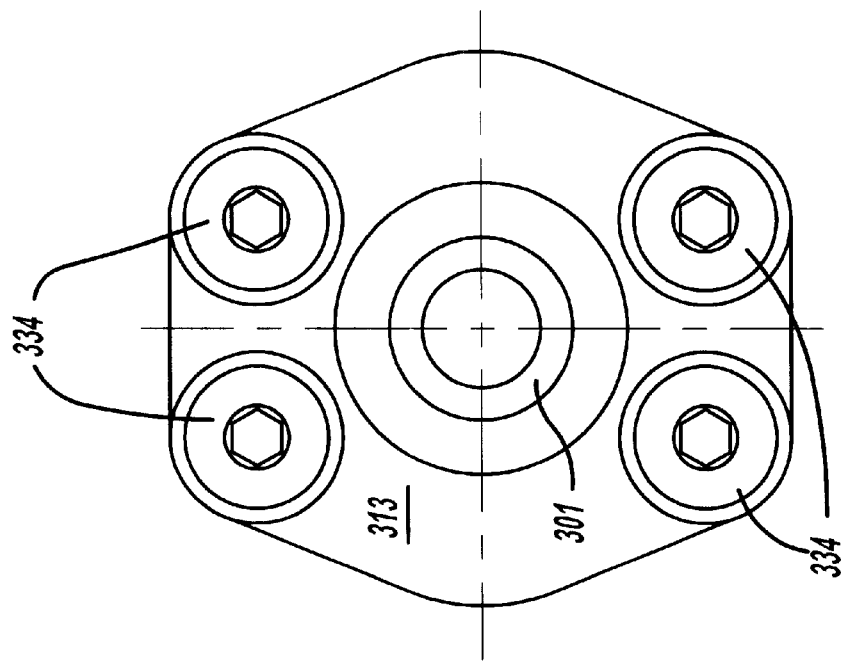
FIG. 4a is a side view of FIG. 4.
Figure 4:
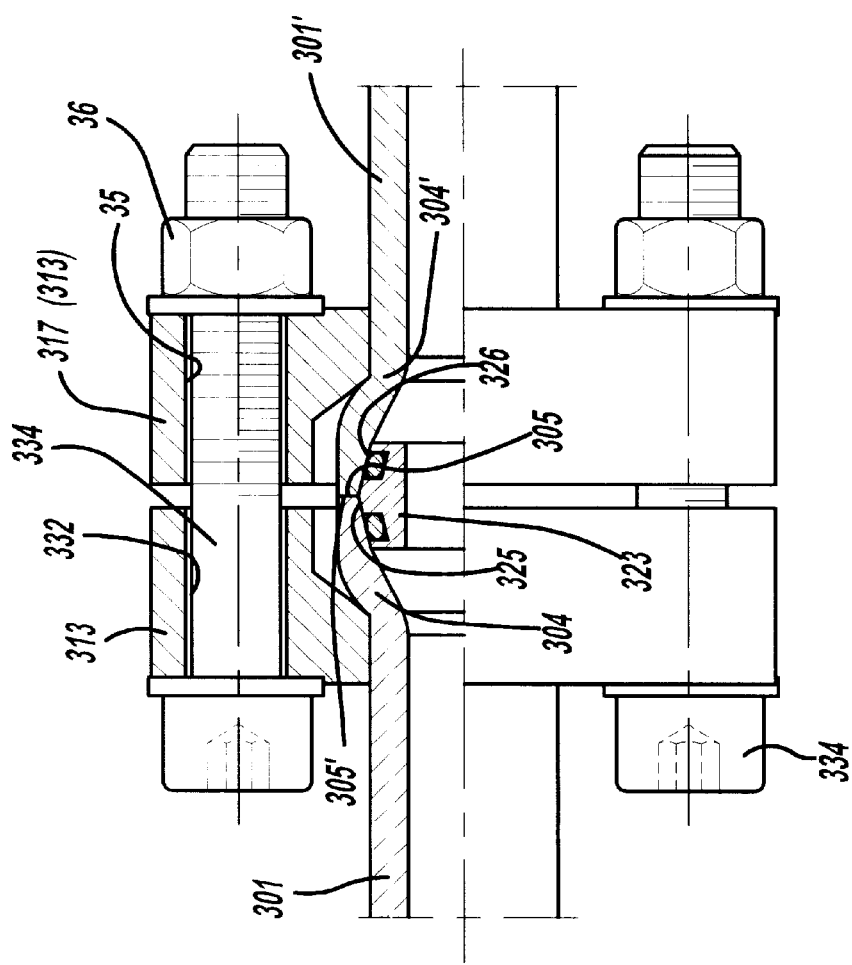
FIG. 4 is a partial longitudinal section view of a further embodiment of a pipe connector where two pipes adjoin one another.

FIG. 4 shows an embodiment of a pipe connector where two pipes 301, 301' are provided with identical connecting portions 304, 304' at their pipe ends. A first connecting element 313 and a second identical connecting element 317 are provided to tension and sealingly press the connecting portions 304, 304' against a sealing element 323.

In the embodiment according to FIGS. 4 and 4a, the second connecting element 317 corresponds to the flange-like embodiment of the first connecting element 313. The two connecting elements 313, 317 are tensioned relative to one another by connecting bolts 334. The connecting bolts 334 pass through bolt through-bores 332 of the first connecting element 313 and through the corresponding bolt through-bores 35 of the second connecting element 317. Each are provided with a nut 36.

A sealing element 323 is provided to seal and center the two pipes 301, 301' relative to one another. The second sealing face 320 of the sealing element 323, like the first sealing face 325, is provided in the shape of a conical outer face. This achieves a symmetric arrangement.

To prevent any excess tightening, the end face 305 of the connecting portion 304 of the pipe 301 stops against the end face 305' of the second pipe 301'. The end face 305' constitutes the stop face for the end face 305 of the first connecting portion 304.

While the above detailed description describes the preferred embodiment of the present invention, the invention is susceptible to modification, variation and alteration without deviating from the scope and fair meaning of the subjoined claims.

What is claimed is:

1. A pipe connector, comprising:
   a connecting portion formed onto an end of a pipe, said connecting portion having an outer conical face with a cone angle of ninety degrees, said conical face starting from an undeformed region of the pipe and increases in size towards an end face of the connecting portion;
   a cylindrical outer face being on said connecting portion and starting from said end face and extending towards said outer conical face;
   a face on said connecting portion positioned between the outer conical face and the end of the cylindrical outer face facing the outer conical face, said face, if necessary, deforming in an undefined way compensating for inaccuracies of the connecting portion during the forming operation;

a first conical bore defined by said connecting portion, said bore tapered from the end face and having a cone angle of twenty-four degrees, a further tapered bore adjoining said first conical bore towards the bore of the undeformed region of the pipe;

a first connecting element having a receiving bore for receiving the undeformed region of the pipe, a conical supporting bore in said first connecting element towards the connecting portion which matches the outer conical face and is designed to rest against said outer conical face;

a sealing element with a central through-bore, a first conical sealing face of said sealing elements matching the first conical bore of the connecting portion and a second sealing face on said sealing element resting against a counter sealing face of a second connecting element or resting against a first conical bore of a further connecting portion formed onto a second pipe; and means for connecting the first connecting element to the second connecting element or the second pipe.

2. A pipe connector according to claim 1 wherein said sealing element also fills the second conical bore of the connecting portion and the diameter of the through-bore is adapted to the diameter of the bore of the pipe.

3. A pipe connector according to claim 1, wherein the first connecting element is in the form of a nut with a threaded bore whose internal diameter is greater than the diameter of the cylindrical outer face of the connecting portion; and the second connecting element is in the form of a connecting body with a conical connecting bore whose size decreases from its end face and which has a cone angle of twenty-four degrees, and forming a counter sealing face, and an adjoining through-bore; and the second sealing face of the sealing element is designed as a matching outer conical face.

4. A pipe connector according to claim 1, wherein the first connecting element is in the form of a flange with circumferentially distributed bolt through-bores for connecting bolts; and the second connecting element includes a through-bore and threaded bores distributed around the through-bore in accordance with the bolt through-bores for the connecting bolts, a planar counter sealing face around the through-bore;

the sealing element includes a longitudinal axis and a planar second sealing face which matches the counter sealing face and on which the longitudinal axis of the sealing element is positioned perpendicularly.

5. A pipe connector according to claim 4, wherein the second connecting element forms part of a component which is to be attached to the pipe.

6. A pipe connector according to claim 1, wherein the end face of the connecting portion is supported against a stop face for the purpose of limiting the degree of tightening.

7. A pipe connector according to claim 6, wherein the stop face is provided on the second connecting element.

8. A pipe connector according to claim 7, wherein the stop face is provided on a collar of the sealing element.

9. A pipe connector according to claim 1, wherein between the first sealing face of the sealing element and the first conical bore of the connecting portion and between the second sealing face of the sealing element and the associated counter sealing face a soft seal is arranged in each case.

10. A pipe connector according to claim 9, wherein the soft seals are received in grooves of the first and second sealing faces.

11. A pipe connector for connecting two pipes to connecting portions formed onto the ends of the pipes;

said connecting portions each comprise an end face and an outer conical face with a cone angle of ninety degrees, said conical face starting from an undeformed region of the pipes increases in size towards the end face of the connecting portion, said connecting portions each comprise a cylindrical outer face starting from the end face and extending towards the outer conical face;

a face on said connecting portions located between the outer conical face and the end of the cylindrical outer face facing the outer conical face, said face, if necessary, deforming in an undefined way compensating for inaccuracies of the connecting portion during the forming operation;

said connecting portions, inside, include a first conical bore which is tapered from the end face and has a cone angle of twenty-four degrees, a further tapered bore portion adjoining said first conical bore and extending towards the bore of the undeformed region of the pipe;

a first connecting element and a second connecting element both including a receiving bore for receiving the undeformed region of the pipe through the bore with its said connecting elements towards the connecting portion including a conical supporting bore which matches the outer conical face of said connecting portions and resting against said connecting portions;

a sealing element with a central through-bore with a first conical sealing face matching the first conical bores of the connecting portions and said second conical sealing face resting against a counter sealing face of a second connecting element;

means for connecting the first connecting element to the second connecting element; and the first and the second connecting elements being flanges with circumferentially distributed bolt through-bores for connecting bolts, said second connecting element corresponding to the first connecting element and said second sealing face of the sealing element being mirror-symmetric relative to the first sealing face.

12. A pipe connector according to claim 6, wherein the end face of the connecting portion is supported against a stop face for the purpose of limiting the degree of tightening.

13. A pipe connector according to claim 12, wherein the stop face is provided on the second connecting element.

14. A pipe connector according to claim 12, wherein the stop face is provided on a collar of the sealing element.

15. A pipe connector according to claim 12, wherein the stop face is formed by the end face of the connecting portion of the further pipe.

16. A pipe connector, comprising:

a first connector, said first connector having an outer conical face with a cone angle of ninety degrees, said conical face starting from an undeformed region of the first connector and increases in size towards an end face of the first connector;

a cylindrical outer face being on said first connector and starting from said end face and extending towards said outer conical face;

a face on said first connector positioned between the outer conical face and the end of the cylindrical outer face facing the outer conical face, said face, if necessary, deforming in an undefined way compensating for inaccuracies of the first connector during the forming operation;

a first conical bore defined by said first connector portion, said bore tapered from the end face and having a cone angle of twenty-four degrees, a further tapered bore adjoining said first conical bore towards the bore of the undeformed region of the first connector;

a first connecting element having a receiving bore for receiving the undeformed region of the first connector, a conical supporting bore in said first connecting element towards the first connector portion which matches the outer conical face and is designed to rest against said outer conical face;

a sealing element with a central through-bore, a first conical sealing face of said sealing elements matching the first conical bore of the first connector portion and a second sealing face on said sealing element resting against a counter sealing face of a second connecting element or resting against a first conical bore of a second connector; and means for connecting the first connecting element to the second connecting element or second connector.

17. A pipe connector according to claim 16, wherein said sealing element also fills the second conical bore of the first connector and the diameter of the through-bore is adapted to the diameter of the bore of the first connector.

18. A pipe connector according to claim 16, wherein the first connecting element is in the form of a nut with a threaded bore whose internal diameter is greater than the diameter of the cylindrical outer face of the first connector; and the second connecting element or second connector is in the form of a connecting body with a conical connecting bore whose size decreases from its end face and which has a cone angle of twenty-four degrees, and forming a counter sealing face, and an adjoining through-bore; and the second sealing face of the sealing element is designed as a matching outer conical face.

19. A pipe connector according to claim 16, wherein the first connecting element is in the form of a flange with circumferentially distributed bolt through-bores for connecting bolts; and the second connecting element or second connector includes a through-bore and threaded bores distributed around the through-bore in accordance with the bolt through-bores for the connecting bolts, a planar counter sealing face around the through-bore;

the sealing element includes a longitudinal axis and a planar second sealing face which matches the counter sealing face and on which the longitudinal axis of the sealing element is positioned perpendicularly.

20. A pipe connector according to claim 16, wherein the end face of the first connector is supported against a stop face for the purpose of limiting the degree of tightening.

* * * * *